W. DIETER.
DEPTH RECORDER FOR TORPEDOES.
APPLICATION FILED MAR. 21, 1914.
1,152,493. Patented Sept. 7, 1915.
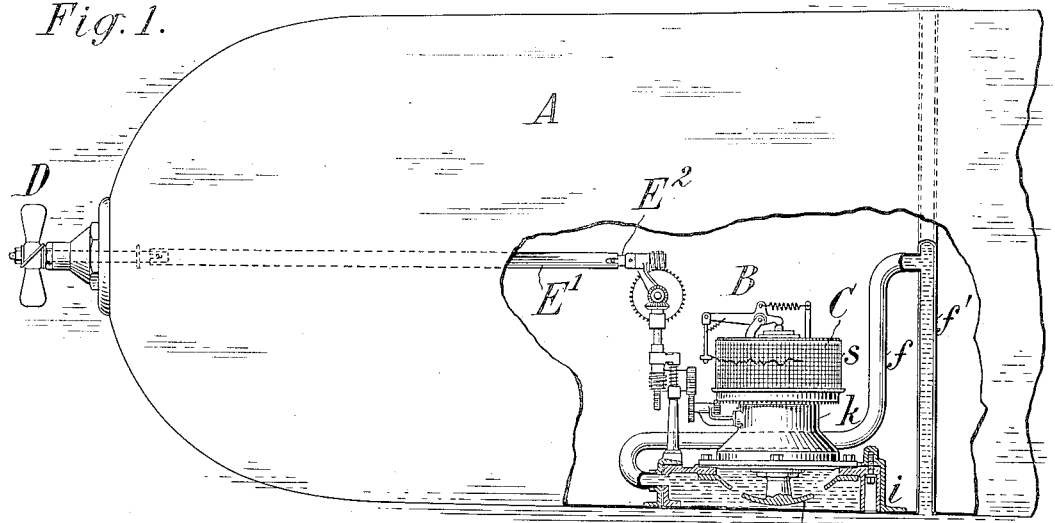
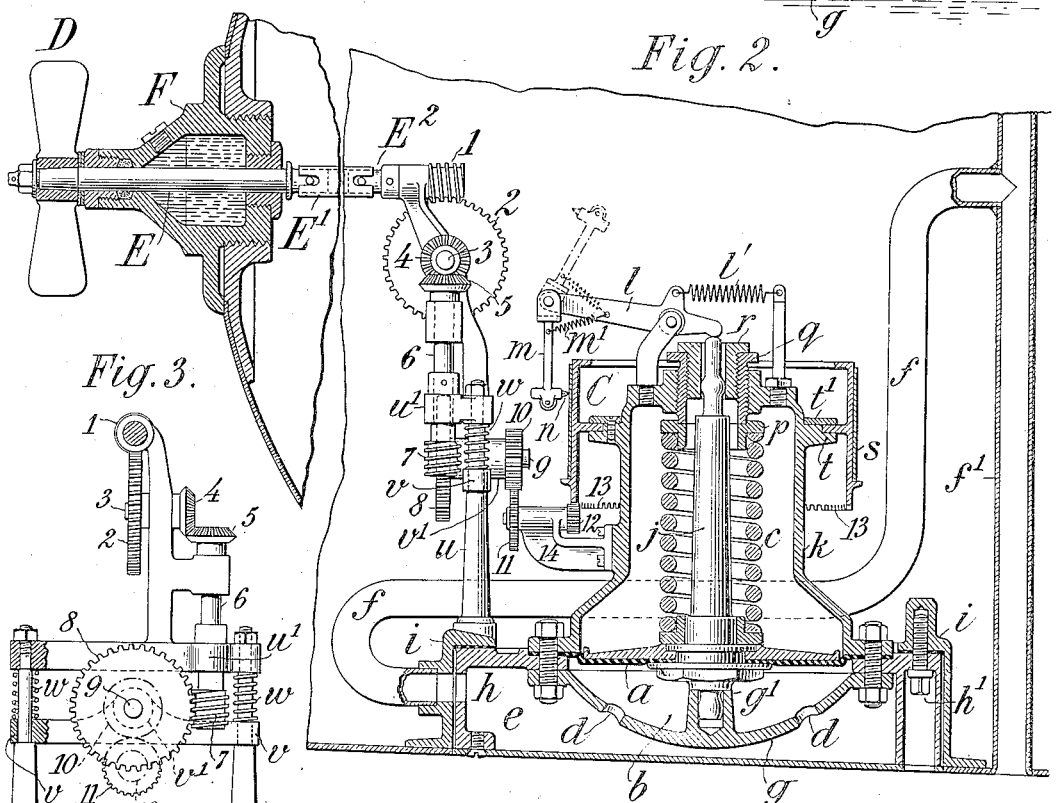
WITNESSES:
René Bruine
Fred White
INVENTOR:
William Dieter,
By Attorneys,
Fraser, Turk & Myers

UNITED STATES PATENT OFFICE.

WILLIAM DIETER, OF NEW YORK, N. Y., ASSIGNOR TO E. W. BLISS COMPANY, OF BROOKLYN, NEW YORK, A CORPORATION OF WEST VIRGINIA.

DEPTH-RECORDER FOR TORPEDOES.

1,152,493.

Specification of Letters Patent.

Patented Sept. 7, 1915.

Application filed March 21, 1914. Serial No. 826,178.

*To all whom it may concern:*

Be it known that I, WILLIAM DIETER, a citizen of the United States, residing in the borough of Brooklyn, county of Kings, city and State of New York, have invented certain new and useful Improvements in Depth-Recorders for Torpedoes, of which the following is a specification.

This invention provides an instrument for recording hydrostatic pressures or depths corresponding thereto and which is especially designed and adaptable for application to the practice-head of an automobile torpedo for keeping a record of the depth at which the torpedo has traveled.

The instrument comprises a diaphragm receiving hydrostatic pressure on the one side and the pressure of a spring on the other, and having means for communicating the movements of the diaphragm to a pencil whereby a sinuous line is traced upon a graduated paper which is moved past the pencil at a predetermined rate. For thus moving the paper it is mounted upon a support, preferably a cylinder, slowly rotated through a train of gearing, the movement being derived from a screw which is mounted in front of the practice-head of the torpedo so that it is rotated by the progress of the torpedo through the water, and its shaft is connected to turn the train of gearing.

The preferred embodiment of the invention is shown in the accompanying drawings, wherein—

Figure 1 is an elevation of the practice-head of a torpedo partly broken away to show the depth-recording instrument which is shown mainly in elevation and partly in section. Fig. 2 is a sectional elevation, the section being in a vertical longitudinal plane, showing the mechanism on a larger scale. Fig. 3 is a front elevation of a detail of the mechanism.

In the drawings A designates as a whole the practice-head of an automobile torpedo. But it may be any other support or moving body which it is desirable to provide with a depth-recording or hydrostatic pressure-recording device. In the construction shown the recording instrument B is placed within the hollow shell of the practice-head. This instrument comprises a diaphragm $a$ (Fig. 2) which is exposed on one side to the hydrostatic pressure in a chamber $b$ and on the other side to the opposite pressure of a spring $c$. The chamber $b$ opens to the exterior water pressure through openings $d$, into a chamber $e$, and thence through a duct $f$ which, through a transverse duct $f'$ communicates with the surrounding water on diametrically opposite sides. The chamber $b$ is formed within a shell $g$ which is fastened to a base plate $h$, which in turn is fastened within a socket ring $i$ attached to the shell of the practice-head.

The diaphragm is attached to a stem $j$ which is suitably guided and which projects at one end beyond the inclosing shell $k$ and acts against a lever $l$, the longer arm of which carries a pencil holder $m$ carrying a pencil (or pen) $n$. A spring $l'$ presses the lever arm against the stem $j$ and a spring $m'$ presses the pencil against a recording drum or cylinder C. The spring $c$ reacts against a collar $p$ which is adjustable by means of a screw $q$ to bring the spring to the proper stress. Within the screw $q$ is a hollow plug $r$, the function of which is to guide the stem $j$.

The parts are shown in Fig. 2 in the initial position, the spring pressure holding the diaphragm displaced against a stop shoulder $g'$. As the torpedo is launched the hydrostatic pressure enters through the ducts $f'$ $f$ and through $e$, $d$, $b$ to the diaphragm, and when this pressure overcomes the stress of the spring the diaphragm moves and the stem $j$ ascends and through the lever $l$ causes the pencil $n$ to move downward; the movement of the diaphragm, stem and pencil is proportional to the increase in the hydrostatic pressure.

As usual in such instruments the cylinder C is caused to slowly turn and has wrapped around it a sheet of graduated paper $s$, which receives the mark or line traced by the pencil. The slow rotation of the cylinder C may be attained by revolving it from any suitable source of motion. In the construction shown it is turned at a rate proportional to the speed of the torpedo in traveling through the water. For this purpose the motor is a screw D mounted in front of the bow of the torpedo, being carried on a shaft E which passes through a shell F fastened centrally to the bow of the practice-head A. The rear end of the shaft communicates motion through an intervening shaft $E^1$ to a spindle $E^2$, the three E, $E^1$, $E^2$ turning as one. The intervening shaft $E^1$ is engaged with its fellows by a loose connection such as a slot and pin connection, as shown, so as to operate without requiring precise alinement of the shafts E and $E^2$.

From the shaft $E^2$ reduced motion is communicated through a train to the cylinder C. In the construction shown the shaft $E^2$ is formed with a worm 1 which drives a worm wheel 2 on a shaft 3, which through miter pinions 4 and 5 rotates at reduced speed a shaft 6 carrying a worm 7, which drives a worm wheel 8 on a shaft 9 carrying a gear 10 which meshes with a gear 11 on a shaft carrying a pinion 12, which meshes with gear teeth 13 cut in the lower edge of the cylinder C. The cylinder C has an internal flange which is received freely in an annular bearing formed by a flange $t$ on the shell $k$, being confined thereto by a ring $t'$ screwed down to said flange as shown. The shaft carrying the gear 11 and pinion 12 is held in a bearing bracket 14 projecting from the shell $k$. As this shell is fastened to the base $h$ the removal of this base carries with it the gears 11, 12 and the cylinder C, so that this cylinder is accessible for removing and replacing the paper $s$, and for reading the record or adjusting the pencil. The base $h$ is fastened in place by screws, one of which is shown at $h'$.

When the base is put in place the gear 11 is brought automatically into mesh with the gear 10. To insure the proper meshing of these gears the gear 10 and its connected parts are given a yielding mounting. These parts are carried on a pair of posts $u$ $u$ mounted on the fixed ring $i$, and connected by a fixed cross-head $u'$; a yoke $v$ has a sliding connection with these posts, being pressed down by springs $w$. The yoke $v$ carries the bearing $v'$ for the shaft 9. If on lifting the base $h$ into place the teeth of gear 11 encounter the teeth of gear 10 (instead of intermeshing), the gears 10, 8, and frame $v$ $v'$ will ascend by compressing the springs until the movement of the gears brings them into proper mesh.

As the torpedo advances through the water the screw D is turned and its rotation is communicated at a much reduced speed to the cylinder C. As the torpedo rises or falls in the water the pencil $n$, being moved by the diaphragm, traces on the paper $s$ carried by the cylinder a sinuous line which records the variations in depth. These variations can be read against the ruled lines on the paper which respectively indicate the depth and the distances traversed.

The instrument is given the maximum accuracy because the spring $l'$ takes up all lost motion in the lever pivots and holds the lever pressed firmly against the stem, the stress of the spring $l'$ constituting a fixed addition to that of the spring $c$. In like manner the spring $m'$ takes up lost motion in the pivotal connection between the pencil holder $m$ and the lever. The spring $m'$ is mounted so as to permit the holder $m$ to be swung back to the position shown in dotted lines for examining, sharpening or replacing the pencil.

The diaphragm or its equivalent and the spring $c$ with any necessary adjustment thereof constitute essentially a hydrostat; and this with the cylinder C and the pencil or other marker and connections for moving the latter, constitute essentially a recording hydrostat; the mechanism for rotating the cylinder constitutes a propelling mechanism whether impelled from the screw D or other source of motion.

The instrument provided by this invention is much more accurate and convenient than those heretofore used. Heretofore it has been customary to mount the entire depth recorder within a slender tubular shell which is inserted centrally through the front or bow end of the practice-head through an opening similar to that closed by the shell F; this necessitates the use of a piston of small area having a considerable range of movement within an elongated cylinder against the stress of a tensile spring, a construction which involves such variations in the friction and other elements as to involve considerable inaccuracy. The necessity of keeping the entire instrument within the dimensions of the contracted opening through which it is inserted renders its parts undesirably fragile and their manipulation difficult.

The present invention subdivides the recording mechanism into two parts, one group, including the parts which ordinarily require no inspection or adjustment, being carried in substantially permanent manner within the shell, while the other group includes those parts which require to be readily accessible and which are mounted for quick and easy withdrawal bodily from the shell. Each time the apparatus is used it is necessary to remove and replace the record sheet $s$ and usually to inspect the pencil; this removal is accomplished by the withdrawal of the fastening screws $h'$ and the taking out of the base $h$ which carries with it all the parts requiring examination. The replacing of these parts is a speedy and convenient operation, the bringing of the gears into mesh being automatically accomplished without any attention by the operator, and the hydraulic parts also coming properly into register so as to establish the hydrostatic connections. The construction of the cylinder or drum C to turn about an axis coincident with that of the stem $j$, so that it surrounds the shell $k$, makes the construction very compact while permitting a large cylinder and hence a large and coarsely graduated record sheet to be used. The diaphragm *a* is of much larger area than the piston heretofore used and the spring *c* is correspondingly stiffer, and, having but a slight range of compression, it affords a more uniform coefficient of stress. The diaphragm *a* is preferably made of exactly the same size as the diaphragm of the hydrostat forming part of the depth-controlling gear of the torpedo; thus not only are these parts interchangeable but the recorder diaphragm receives precisely the same hydrostatic pressure as the depth-engine diaphragm. The introduction and the removal of the elements or group through the side or bottom of the shell, instead of through the bow, enables the parts to be made of much larger size because it is practicable to make the opening much larger; thus the fragility and undesirable delicacy of the former construction are avoided.

I claim as my invention:—

1. A submersible vessel having a lateral opening in its hull, combined with a recording hydrostat fitting said opening with its recording means entering within the vessel, and removable through said opening, and driving mechanism for said recording means mounted within the vessel.

2. A submersible vessel having a lateral opening in its hull, a hydrostat fitting into said opening, and removable therefrom, comprising a pressure-responsive part, a member moved thereby, and a rotary record-receiving part, driving means mounted in said vessel, and a separable driving connection therefrom to said record-receiving part, whereby the hydrostat is removable without the driving mechanism to get access to the record-receiving part and on replacing it the latter is automatically connected.

3. A submersible vessel having a lateral opening in its hull, a screw at the bow, and a shaft turned by said screw entering within the vessel, combined with a hydrostat fitting removably into said opening and comprising a pressure-responsive part, a marker moved thereby, and a rotary record-receiving part, and means for transmitting rotation from said shaft to turn said receiving part, the latter separable from said transmitting means to permit the removal of the hydrostat.

4. A submersible vessel having a lateral opening with a marginal mounting, and having a hydrostatic duct leading to such mounting, combined with a recording hydrostat comprising a base fitting said mounting and having a hydrostat chamber communicating with said duct, and a diaphragm exposed to said chamber.

5. A depth recorder for a submersible vessel, comprising a recording hydrostat having a recording cylinder and a base for said hydrostat whereby it constitutes a unit removable from such vessel, and driving mechanism for rotating said cylinder mounted within the vessel and adapted to be brought into operative engagement with the cylinder upon the insertion of the hydrostat unit in place within the vessel.

6. A depth recorder for a submersible vessel comprising a recording hydrostat having a recording cylinder and a base for said hydrostat whereby it constitutes a unit removable from such vessel, and driving mechanism for rotating said cylinder mounted within the vessel, and comprising a train of gearing having two separable intermeshing gears, said train including one of said gears mounted within the vessel, and the other of said gears carried by the hydrostat unit, whereby upon the insertion of the hydrostat unit its gear is brought into operative engagement with the other gear.

7. A depth recorder for a submersible vessel, comprising a recording hydrostat having a recording cylinder, and a base for said hydrostat whereby it constitutes a unit removable from such vessel, and driving mechanism for rotating said cylinder mounted within the vessel, and comprising a train of gearing having two separable intermeshing gears, said train including one of said gears mounted within the vessel, and the other of said gears carried by the hydrostat unit, one of said gears being yieldingly mounted whereby upon the insertion of the hydrostat unit its gear is brought yieldingly into operative engagement with the other gear.

In witness whereof, I have hereunto signed my name in the presence of two subscribing witnesses.

WILLIAM DIETER.

Witnesses:
ARTHUR DRANT,
EMIL SARACINO.